United States Patent [19]

Johnson

[11] 4,027,911
[45] June 7, 1977

[54] SLEEPER/CAMPER ATTACHMENT

[76] Inventor: George Verne Johnson, 5510 SW. Buddington, Portland, Oreg. 97219

[22] Filed: Dec. 8, 1975

[21] Appl. No.: 638,653

[52] U.S. Cl. .................................. 296/23 H; 52/66
[51] Int. Cl.² ...................................... B60P 3/34
[58] Field of Search ......... 296/23 H, 23 MC, 23 G, 296/23 E, 23 F, 23 R, 10, 27; 52/66, 70

[56] References Cited

UNITED STATES PATENTS

| 1,320,794 | 11/1919 | Palmer et al. | 296/23 MC |
| 1,857,081 | 5/1932 | Fontaine | 296/23 H |
| 1,864,047 | 6/1932 | Lanhorne | 296/23 F |
| 1,881,482 | 10/1932 | Gilkison | 296/23 R |
| 2,860,384 | 11/1958 | Wait et al. | 296/23 G |
| 3,290,085 | 12/1966 | Damiani | 296/23 F |
| 3,429,608 | 2/1969 | Farnum | 296/23 R |
| 3,466,082 | 9/1969 | Branch | 296/23 R |
| 3,724,893 | 4/1973 | Giroux | 296/23 R |
| 3,753,590 | 8/1973 | Covix | 296/23 R |
| 3,790,207 | 2/1974 | Anderson | 296/23 G |

Primary Examiner—Joseph F. Peters, Jr.
Assistant Examiner—David M. Mitchell
Attorney, Agent, or Firm—Lee R. Schermerhorn

[57] ABSTRACT

A cover of double bed size is hinged on one side of a pickup truck to form a bed beyond the side of the truck. Pivotal legs on the opposite side of the cover are equipped with latches to latch the cover closed. A pivot arm for the rear leg forms an air scoop for pressurizing the storage space under the closed cover to keep out dust in travelling. The cover is opened and closed by a hand crank windlass, by an electric or hydraulic winch and cable or by a hydraulic cylinder.

10 Claims, 7 Drawing Figures

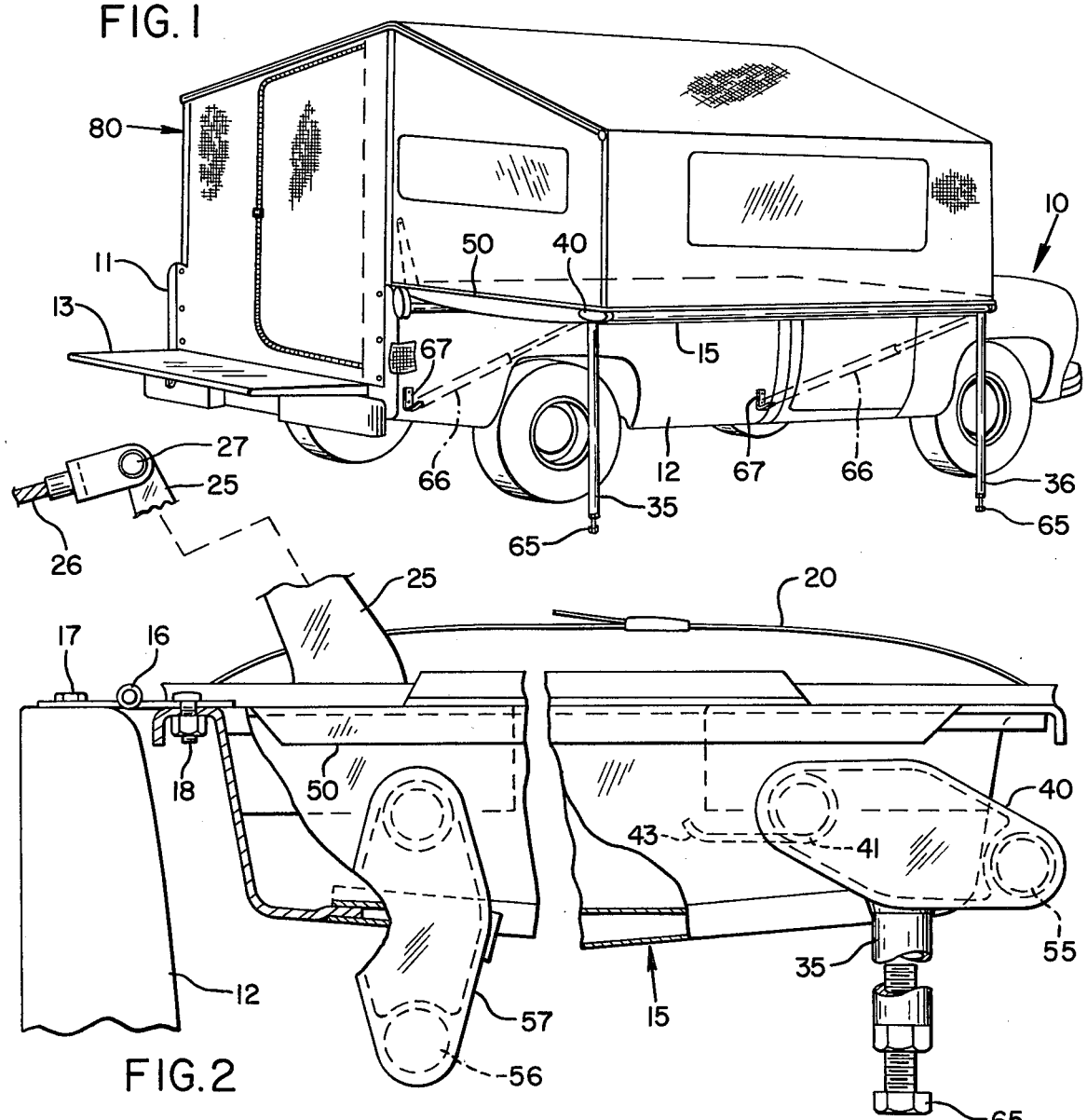
FIG.1
FIG.2
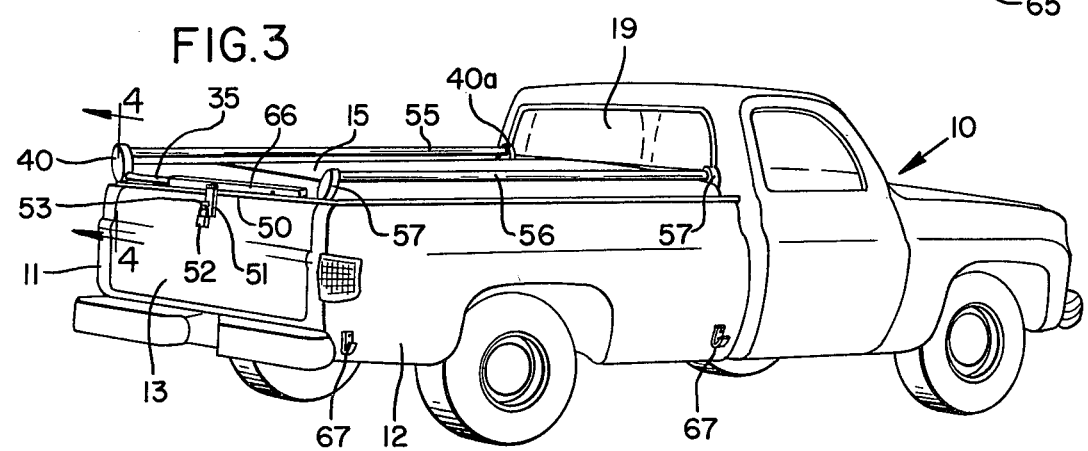
FIG.3

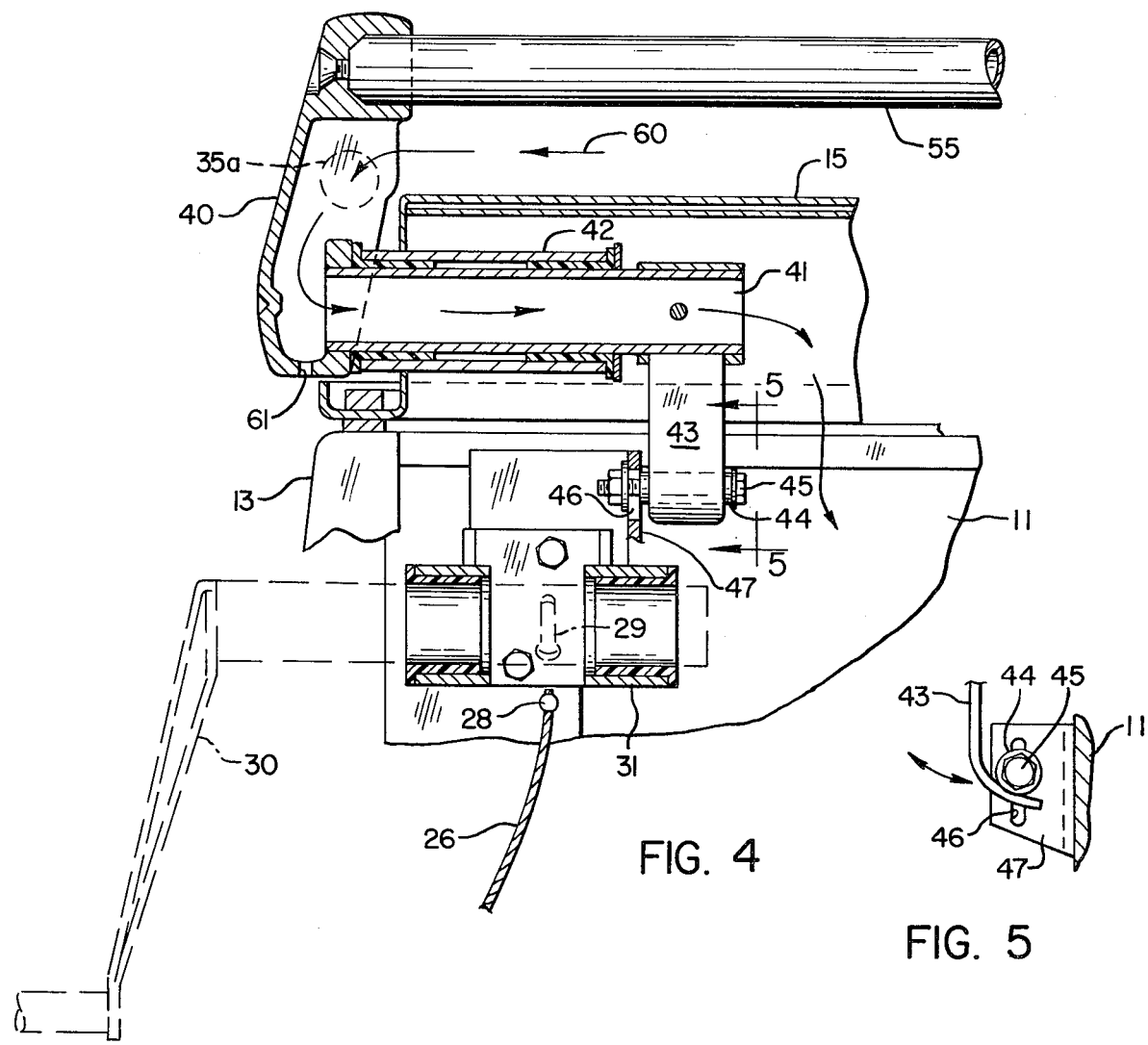
FIG. 4
FIG. 5
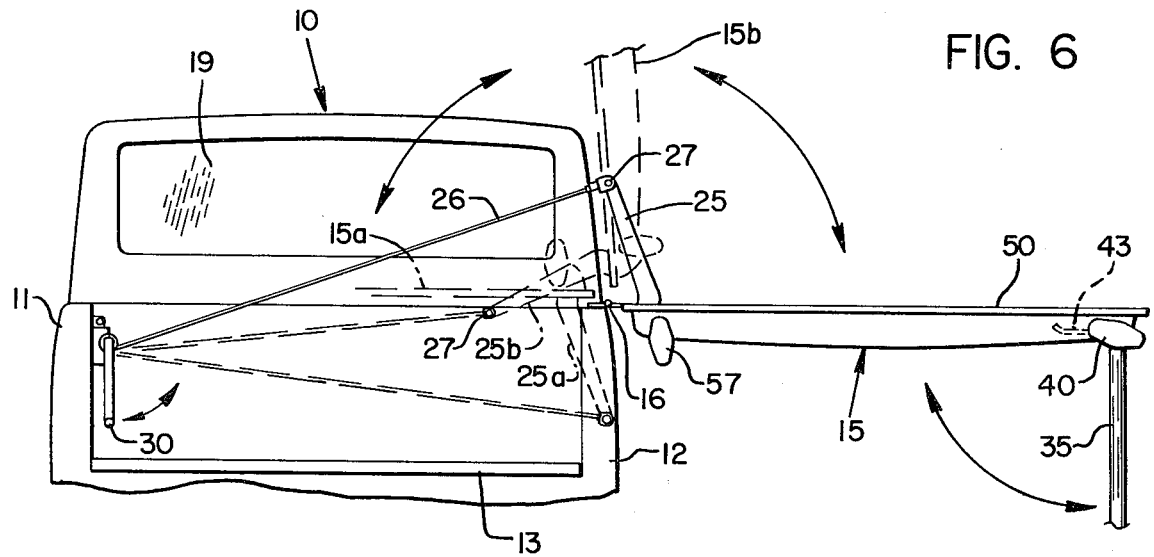
FIG. 6

SLEEPER/CAMPER ATTACHMENT

BACKGROUND OF THE INVENTION

This invention relates to a sleeper/camper attachment for mounting on a pickup truck.

Most camper attachments heretofore proposed have been designed for extended camping trips, making elaborate provisions for living quarters to be used day after day. This makes the equipment too complicated and expensive to be practical for many purposes. There is a need for a more simple and inexpensive type of equipment as, for example, for the weekend fisherman who spends the days fishing and requires only a simple shelter in which to sleep at night.

Objects of the present invention are, therefor, to provide an improved sleeper/camper attachment for the purpose described, to provide a sleeper/camper attachment having a full size double bed facility in a minimum of space, to provide a sleeper/camper attachment of relatively simple and inexpensive construction and to provide a double bed accommodation in a cover for a pickup truck which is easy to open and close.

SUMMARY OF THE INVENTION

In the present construction, a cover of double bed size is hinged on one side of a pickup truck. Pivotal legs on the opposite side of the cover are equipped with latches to hold the cover closed. A pivot arm for the rear leg forms an air scoop for pressurizing the space under the closed cover to keep out dust in travelling. The cover is opened and closed by a hand crank windlass, by an electric or hydraulic winch and cable or by a hydraulic cylinder. Such hydraulic equipment may be powered by the hydraulic steering system in the vehicle.

The invention will be better understood and additional objects and advantages will become apparent from the following description of the preferred embodiments illustrated in the accompanying drawings. Various changes may be made, however, in the details of construction and arrangement of parts and certain features may be used without others. All such modifications within the scope of the appended claims are included in the invention.

BRIEF DESCRIPTION OF THE DRAWINGS

FIG. 1 is a perspective view showing a pickup truck equipped with a sleeper/camper attachment embodying the invention, including a tent for shelter.

FIG. 2 is a vertical sectional view with parts broken away showing the cover of the attachment in open position;

FIG. 3 is a perspective view of the truck showing the sleeper/camper attachment folded for travel;

FIG. 4 is a view on the line 4—4 in FIG. 3;

FIG. 5 is a view on the line 5—5 in FIG. 4;

FIG. 6 is a rear elevation view with the tailgate open showing the operation of the hand crank windlass in FIG. 4 for opening and closing the cover.

DESCRIPTION OF THE PREFERRED EMBODIMENTS

Figure 7:
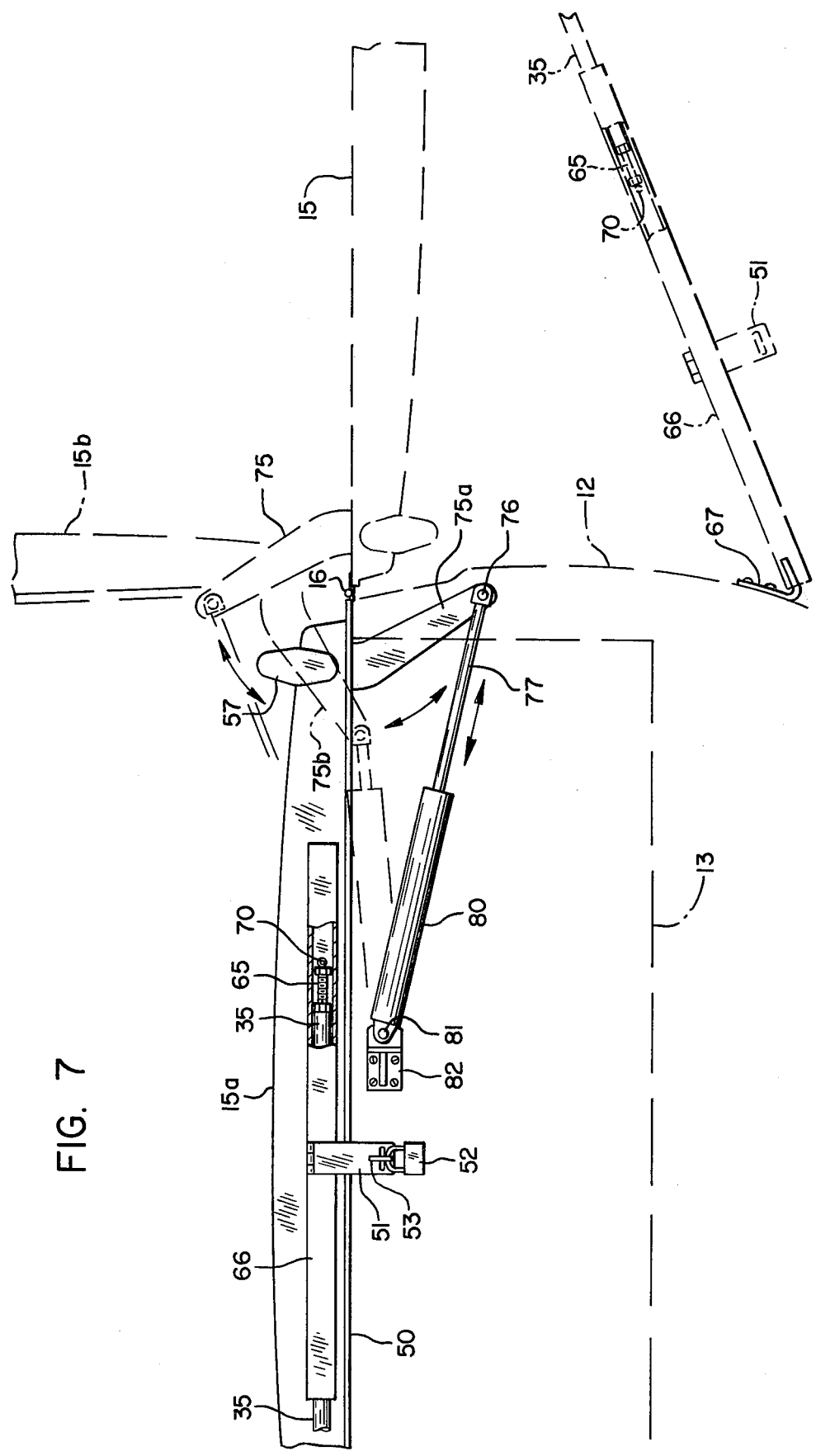
FIG. 7 is a similar view showing a hydraulic cylinder for opening and closing the cover.

With reference to FIGS. 1 and 2, the present attachment is illustrated by way of example in connection with a conventional type of pickup truck 10, although the attachment may also be applied to trailers and other types of vehicles. Behind the cab is a truck body having a left side 11, a right side 12 and a tailgate 13 hinged along its bottom edge.

The present attachment comprises essentially a cover 15 having a length approximately equal to the length of sides 11 and 12, and having a width to span the distance between sides 11 and 12. One side of the cover is connected to the truck by hinges 16 on the right side of the truck. One leaf of hinge 16 is secured to the top edge of side 12 by screws 17 and the other leaf is secured to the edge of the cover by bolts 18 as shown in FIG. 2.

When the cover is closed as shown in FIG. 3, it rests on the upper edges of sides 11 and 12, and meets the top edge of tailgate 13 to enclose a space in the truck body without obstructing the view through the rear window 19 of the cab. Cover 15 is of sufficient depth to contain, or partially contain, the mattress and blankets for a double bed, such bedding being retained in the hollow of the cover by straps 20 or other suitable means. Mechanism is provided so that the cover 15 loaded with bedding may be opened and closed by one person. For this purpose, a lever arm 25 is rigidly mounted on the under side of the cover at its rear end, adjacent to the rear hinge 16 as shown in FIGS. 2 and 6. Arm 25 is mounted in angular relation to the cover so that when the cover is open, the upper end of arm 25 is in the vertical plane of hinge 16.

Cover 15 and arm 25 swing through an arc of 180° whereby in the closed position of the cover indicated at 15a in FIG. 6, the arm extends downward in the position indicated at 25a within the truck and with the free end of the arm again approximately in the vertical plane of hinge 16. When cover 15 is in upstanding position as indicated at 15b, the arm assumes the position indicated at 25b with its free end slightly below the horizontal plane of the axis of the hinge.

One end of a cable 26 is connected to a clevis on a pin 27 in the free end of arm 25. The other end of cable 26 is equipped with a knob fitting 28 which may be inserted in a circumferential keyhole slot 29 in the tubular shank of a removable hand crank 30. Crank 30 rotates in a bearing bracket 31 mounted on the upper portion of truck side 11 just inside tailgate 13. When the tailgate is opened down as shown in FIG. 6, crank 30 may be inserted in bearing bracket 31 and cable knob 28 inserted in keyhole slot 29 to operate the crank as a windlass for winding in and paying out a length of cable 26.

To open the cover from its closed position at 15a in FIG. 6, cable is wound in by crank 30 until pin 27 reaches a common plane through hinge 16 and the axis of the crank, with the arm in its intermediate position at 25b. The cover is then upright in its 15b position and if the rotation of the crank is immediately reversed, the momentum of the cover will cause the cover to pass over center with respect to hinge 16 and start to rotate down in a clockwise direction toward open position. Restraint applied to the crank handle then brakes the descent of the cover as it swings down to horizontal open position shown in solid lines at 15, while the arm swings up to its solid line position at 25. The cable may then be detached from the keyhole slot 29 in the crank so as not to obstruct access into the rear end of the truck.

Cover 15 is closed by the same sequence of operations. Cable 26 is wound in by the crank until the balance point of the cover is reached at position 15b whereupon the rotation of the crank is reversed, allowing the momentum of the cover in counterclockwise rotation to carry it over center with respect to hinge 16 toward closed position. Then by applying restraint to the rotation of the crank, the cover is lowered slowly as cable is payed out while the arm swings downward to its position at 25a. Then with the cover closed, cable 26 may be detached from keyhole slot 29, the crank removed from bearing bracket 31 and tailgate 13 closed under the closed cover 15.

Cover 15 is supported in open position by a rear leg 35 and a front leg 36 as seen in FIG. 1. These legs also have a latching function to latch the cover closed. Rear leg 35 is welded to the arm 40 in FIG. 2. The position of the leg is indicated by circle 35a in FIG. 4. Arm 40 is welded to the rear end of a hollow journal tube 41 which rotates in a horizontal bearing 42 near the outer edge of cover 15. The inner end of journal tube 41 carries a spring catch 43 having a curved tongue which engages under a roller 44 on a bolt 45. Bolt 45 is adjustable vertically in a slot 46 in a bracket 47 on truck side 11, as shown in FIGS. 4 and 5.

As cover 15 is raised in its initial closing movement from open position in FIG. 6, leg 35 hangs in vertical position until it encounters a flange 50 on the rear end of the cover when the cover reaches its upright position at 15b. Then as the cover approaches closed position, leg 35 rests on flange 50 and may be lifted by hand through a small angle so that latch 43 will pass below bolt 45. When the cover is fully closed, leg 35 is moved down against flange 50 in FIG. 3, causing latch 43 to engage under roller 44 in FIG. 5. Leg 35 is equipped with a hasp 51 which may be secured by padlock 52 to an eye 53 on tailgate 13, thereby locking both the cover 15 and tailgate 13 in closed positions. Further reference will be made to this detail as the description proceeds.

Front leg 36 is mounted on an arm 40a similar to the arm 40. Arm 40a is also associated with a latch mechanism as shown in FIGS. 4 and 5. A torque tube 55 interconnects the arms 40 and 40a so that both legs and their associated latch devices will move in unison to latch and unlatch both the front and rear ends of the cover. In FIG. 3, the cover is unlatched by removing padlock 52 and raising leg 35 through a small angle above flange 50. Leg 35 is raised in this manner as the operator starts to raise the cover by crank 30, until latch 43 rises above bolt 45 in FIG. 5.

When cover 15 is closed as shown in FIG. 3, torque tube 55 is spaced a short distance above the cover and may be used as a support or luggage rail for a load to be carried above the cover. For this purpose, a second tube 56 is mounted on fixed brackets 57, similar in appearance to the arms 40 and 40a, on the hinge side of the cover. The only functional utility of tube 56 is to provide one side of a support rack or luggage rail for an external load.

Rear arm 40 also serves as an air scoop to pressurize the air in the enclosed space in the truck while travelling. The arm 40 is U-shaped in cross section with an open side facing forward to receive an air flow as indicated by arrows 60 in FIG. 4. This air passes through the hollow journal tube 41 and is discharged into the truck space under cover 15 maintaining sufficient pressure to prevent the entrance of road dust through the various joints and crevices. A persistent problem in trucks and campers has been the tendency of a fast moving vehicle to develop subatmospheric pressure at its rear end, depressing the interior pressure and causing dust to be drawn in through joints and crevices in the body. Drain hole 61 allows the escape of rain water.

As shown in FIGS. 1 and 2, each leg 35 and 36 is equipped with an adjustable foot 65 to rest on the ground. As shown in broken lines in FIG. 1, each leg 35 and 36 also includes a removable tubular extension leg 66 to support cover 15 on a pair of brackets 67 on the truck. Hasp 51 in FIG. 3 is mounted on extension 66 on leg 35.

The details of extension leg 66 are shown in FIG. 7. Extension leg 66 contains a transverse pin 70 near one end. When cover 15 is in open position, the end of leg 35 and its foot 65 are inserted in the end of extension leg 66 which contains the pin 70 and the projecting end of bracket 67 is inserted in the other end as shown in broken lines. Foot 65 then rests on pin 70 to support cover 15 on bracket 67. The other extension leg 66 is applied in the same manner to front leg 36 in FIG. 1.

When cover 15 is closed to its solid line position in FIG 7, leg 35 and foot 65 are inserted in the end of extension leg 66 which is remote from pin 70, placing hasp 51 at the center of tailgate 13 whereby both the cover 15 and tailgate 13 may be locked closed by padlock 52 as previously described.

FIG. 7 also illustrates alternative means for opening and closing cover 15. Arm 75 is similar to arm 25, but is mounted at the front end of cover 15. A pin 76 pivotally connects the end of arm 75 with a poston rod 77 in a hydraulic cylinder 80. Cylinder 80 is pivotally mounted at 81 on a bracket 82 on the back of the cab of the truck or other suitable support. The cylinder may be supplied with hydraulic fluid from the pump which supplies the hydraulic steering system on the vehicle or other suitable source of hydraulic pressure having control valuves for the operator in the cab.

Piston rod 77 in FIG. 7 operates the same as cable 26 in FIG. 6 to open and close the cover 15. When the cover is closed in its solid line position at 15a with arm 75 in its position at 75a, hydraulic pressure in the rod end of cylinder 80 retracts the piston rod and swings arm 75 to its position at 75b raising the cover to vertical position at 15b. The momentum of the cover in its opening movement causes it to overbalance and swing down to open position at 15 as hydraulic fluid is gradually relieved from the rod end of cylinder 80 by the control valve, the arm 75 extending upward in the open position of the cover.

The cover is closed in the same manner by admitting hydraulic fluid under pressure to the rod end of cylinder 80 to retract the piston rod and move arm 75 to its position at 75b, as the cover assumes upright position at 15b. Then, as hydraulic fluid is relieved from the rod end of the cylinder, the cover swings down by gravity to its closed position at 15a. As the cover approaches closed position, it is latched manually by leg 35 as described in connection with FIGS. 4 and 5.

The cover 15 may also be power operated by an electric or hydraulic winch and cable. In such case, the arm 75 is connected to a cable from the winch instead of piston rod 77 in FIG. 7. Such arrangement is similar to that in FIG. 6 except that the winch which takes the place of hand crank windlass 30 is mounted in the front end of the truck body whereby the cable need not be detached from the winch. With a reversing switch or valve in the cab, the operator may observe the movement of the cover in opening and closing and reverse the winch as described in the manipulation of crank 30 in FIG. 6.

The latching leg arrangement makes it impossible to inadvertently drop the cover 15 down to the ground with either manual or power operation. As the cover approaches vertical position at 15b in FIG. 6, in its opening movement the leg 35 lies against flange 50. Then, as the cover swings outward away from the truck, the legs 35 and 36 swing away from the cover and hang in vertical positions by gravity until feet 65 touch the ground, arresting the downward movement of the cover in its solid line position in FIG. 6.

The truck body and cover 15 are equipped with suitable sockets to receive poles for the frame of a tent covering indicated generally at 80 in FIG. 1. The details of the tent form no part of the present invention and may be adapted for the purpose by persons skilled in the art. Opening cover 15 on the right side of the truck has the advantage of placing the bed on the curb side of the vehicle when parked on a roadway or street whereby the projection of the bed does not interfere with traffic. The pivoting of the cover on one side of the truck doubles the living space and provides a full size double bed in even the smallest of pickup trucks available on the market at the present time.

What is claimed is:

1. A sleeper/camper attachment for a pickup truck and the like having upstanding sidewalls, comprising a cover having a hinge on one side edge connected to the upper edge of one of said sidewalls, an arm rigidly mounted on the under side of said cover adjacent said hinge, means connected with said arm for opening said cover and for closing the opposite side edge of said cover on the upper edge of the other sidewall, a leg having a pivotal mounting adjacent said opposite side edge of said cover for supporting the cover in a horizontal open position, and latch means on said leg engaging said other sidewall to latch said cover in closed position, said opening and closing means comprising a windlass on said other sidewall having a cable with one end connected to said arm, said windlass comprising a hand crank, and means for detachably connecting the opposite end of said cable with said crank for winding in and paying out said cable.

2. An attachment as defined in claim 1, said arm extending toward said windlass when said cover is in vertical position, said cover being opened by winding in said cable to raise said cover to said vertical position, and then paying out said cable to lower said cover to said horizontal open position, and said cover being closed by winding in said cable to raise said cover to said vertical position and then paying out said cable to lower said cover to closed position.

3. A sleeper/camper attachment for a pickup truck and the like having upstanding sidewalls, comprising a cover having a hinge on one side edge connected to the upper edge of one of said sidewalls, an arm rigidly mounted on the under side of said cover adjacent said hinge, means connected with said arm for opening said cover and for closing the opposite side edge of said cover on the upper edge of the other sidewall, a leg having a pivotal mounting adjacent said opposite side edge of said cover for supporting the cover in a horizontal open position, and latch means on said leg engaging said other sidewall to latch said cover in closed position, said leg being disposed in horizontal position above a tailgate on said truck when said cover is latched closed, and means for locking said leg to said tailgate to lock both said cover and tailgate in closed position.

4. An attachment as defined in claim 3, said leg hanging in vertical position by gravity as said cover swings outward away from the truck so that said leg will come to rest on the ground and stop the downward movement of said cover.

5. An attachment as defined in claim 3, said opening and closing means comprising a cylinder and piston unit having a piston rod connected with said arm, and means for pivotally mounting said cylinder on the truck.

6. An attachment as defined in claim 3 including a bracket adapted for mounting on said truck to support said leg, and a leg extension member slidably mounted on said leg to adapt the leg for support either on the ground or on said bracket.

7. An attachment as defined in claim 3, said locking means comprising a tubular leg extension receiving said leg, and a hasp on said extension.

8. A sleeper/camper attachment for a pickup truck and the like having upstanding sidewalls, comprising a cover having a hinge on one side edge connected to the upper edge of one of said sidewalls, an arm rigidly mounted on the under side of said cover adjacent said hinge, means connected with said arm for opening said cover and for closing the opposite side edge of said cover on the upper edge of the other sidewall, a leg having a pivotal mounting adjacent said opposite side edge of said cover for supporting the cover in a horizontal open position, and latch means on said leg engaging said other sidewall to latch said cover in closed position, said leg being on the rear end of said cover, a similar leg and latch means on the front end of said cover, said pivotal mounting for each leg including a lever arm extending above said cover in the closed position of the cover, and a torque tube interconnecting said lever arms to move both of said legs in unison.

9. An attachment as defined in claim 9, said pivotal mounting for said rear leg including a forwardly directed air scoop outside of said cover communicating with the space in said truck under said cover to pressurize said space by the forward movement of the truck when said cover is closed.

10. An attachment as defined in claim 9, said pivotal mounting including a tubular journal for said lever arm having an inner end within said space, said lever arm forming said air scoop communicating with an outer end of said journal.

* * * * *